United States Patent

Kitamura

[11] Patent Number: 5,914,885
[45] Date of Patent: Jun. 22, 1999

[54] THERMAL TREATMENT APPARATUS AND METHOD

[75] Inventor: Masanori Kitamura, Shiga-ken, Japan

[73] Assignee: Murata Manufacturing Co., Ltd., Nagaokakyo, Japan

[21] Appl. No.: 08/805,680

[22] Filed: Feb. 27, 1997

[30] Foreign Application Priority Data

Feb. 28, 1996 [JP] Japan .................................... 8-041170

[51] Int. Cl.$^6$ .................................................. G06F 19/00
[52] U.S. Cl. .................................. 364/477.01; 364/528.35
[58] Field of Search ......................... 364/477.01, 477.03, 364/477.04, 477.05, 477.06, 557, 528.34, 528.35, 528.09; 340/588, 589; 432/32, 36, 37, 51; 219/487, 472–474, 490–494, 506; 702/130

[56] References Cited

U.S. PATENT DOCUMENTS

| | | | |
|---|---|---|---|
| 4,276,603 | 6/1981 | Beck et al. | 364/477.03 |
| 4,463,437 | 7/1984 | Schenck et al. | 364/477.03 X |
| 4,807,144 | 2/1989 | Joehlin et al. | 364/477.03 X |
| 5,072,360 | 12/1991 | Knorpp et al. | 364/477.03 X |
| 5,231,645 | 7/1993 | Uno et al. | 364/477.04 X |
| 5,560,531 | 10/1996 | Ruszowski | 228/19 |

*Primary Examiner*—Joseph Ruggiero
*Attorney, Agent, or Firm*—Burns, Doane, Swecker & Mathis, LLP

[57] ABSTRACT

A thermal treatment apparatus comprises a heating device for heating a thermal treatment chamber, and a gas supplying device for supplying atmospheric gas to the thermal treatment chamber. A temperature measuring device measures temperature in the thermal treatment chamber, and a time measuring device measures a heat treatment time during which the heating device heats the thermal treatment chamber. A control device controls the heating conditions provided by the heating device and atmospheric gas supply conditions provided by the gas supplying device in coordinated relation to each other based on the temperature in the thermal treatment chamber measured by the temperature measuring device and the heat treatment time measured by the time measuring device. The thermal treatment chamber can therefore be controlled more accurately. The invention also pertains to a method for using the above-described thermal treatment apparatus.

21 Claims, 4 Drawing Sheets

THERMAL TREATMENT APPARATUS AND METHOD

BACKGROUND OF THE INVENTION

1. Field of the Invention

The present invention relates to a thermal treatment apparatus and method which supplies heat and atmospheric gas to a thermal treatment chamber as a function of a measured temperature in the thermal treatment chamber.

2. Description of the Related Art

FIG. 4 is a block diagram showing a conventional thermal treatment apparatus. As shown there, the thermal treatment apparatus 50 comprises a heating system 51 and a gas supplying system 52. A recorder 53 records a temperature in a thermal treatment chamber 54 and also records the amounts of gas supplied to the thermal treatment chamber.

The heating system 51 includes heaters 55 for heating the thermal treatment chamber 54 and thermocouples 56 for measuring the temperature of the thermal treatment chamber 54. A plurality of temperature controllers 57 control the heating conditions of the heaters 55 through a respective plurality of thyristors 58 in accordance with the temperature in the thermal treatment chamber 54 as measured by the thermocouples 56.

The gas supplying system 52 includes gas flow rate controllers 60 for controlling amounts of atmospheric gas delivered to the thermal treatment chamber 54 from an atmospheric gas supply section (not shown) through mass flow controllers 59.

The thermal treatment apparatus 50 controls a heating condition and a gas supply condition in the thermal treatment chamber 54 as follows. The temperature controllers 57 control the heating condition in a time sequence based on temperature information received from the thermocouples 56, while the mass flow rate controllers 59 control the gas supply in a time sequence based on signals received from the gas flow rate controllers 60. More specifically, when it is detected that the thermal treatment chamber 54 reaches a predetermined temperature on the basis of temperature information received from the thermocouples 56, the temperature controllers 57 and the gas flow rate controllers 60 supply heat and gas corresponding to pre-set profiles. These profiles specify the manner in which the thermal treatment chamber 54 is controlled as a function of the sensed temperature of the thermal treatment chamber 54. Time measuring means (not shown) in the controllers 57 and 60 then measure fluctuation points in the profiles (that is, points in time where gradients of the profiles change), so that heat control and gas supply control corresponding to the profiles are performed on the basis of the results of the time measurement.

The conventional thermal treatment apparatus 50 constructed as described above encounters a number of problems. As described above, the heating system 51 and the gas supplying system 52 control the heating and gas supplying conditions following the profiles based on the time measuring means included in each of the controllers 57 and 60. However, the heating system 51 and the gas supplying system 52 control the profiles based on time measured by different time measuring means. It is therefore difficult to make the timing of the heating profile fluctuation point coincide with that of the gas supply profile fluctuation point. Particularly, in profiles that have a long time interval between profile fluctuation points, it is difficult to make the timings coincide with each other. For this reason, the heating system 51 and the gas supplying system 52 cannot be controlled in relation to each other with high accuracy, so heat treatment with high accuracy can not be performed.

In addition, the heating and the gas supply profiles are inputted to the temperature controllers 57 and the gas flow rate controllers 60, respectively, in accordance with the object to be heat-treated. At this time, the profiles should be inputted in relation to each other such that the profile fluctuation points coincide with each other. However, these profiles are inputted to different controllers 57 and 60, so that it is very difficult to input the profiles in relation to each other. Particularly, in recent years, the thermal transfer chamber 54 has been divided into a plurality zones to control heating, and to supply a plurality of atmospheric gases (e.g., referring to FIG. 4, the heating is controlled in three zones, and three types of atmospheric gas are supplied). This compounds the complexity and difficulty associated with inputting the profiles for controlling the heating and gas supply in relation to each other, making inputting errors a likely occurrence.

Further, the more complicated control becomes, the more the number of controllers 57 and 60 increases, thereby causing an increase in the cost of the apparatus.

SUMMARY OF THE INVENTION

Accordingly, it is an exemplary object of the present invention to provide a thermal treatment apparatus and method which can perform control with high accuracy and with reduced cost, in which the profiles are easily inputted.

According to an exemplary aspect of the present invention, there is provided a thermal treatment apparatus comprising a heating means for heating a thermal treatment chamber. A gas supplying means supplies atmospheric gas to the thermal treatment chamber and a temperature measuring means measures temperature in the thermal treatment chamber. A time measuring means measures heat treatment time, and a control means controls heating conditions provided by the heating means and controls atmospheric gas supply conditions provided by the gas supplying means in coordinated relation to each other based on the temperature in the thermal treatment chamber measured by the temperature measuring means and the heat treatment time measured by the time measuring means.

According to another exemplary aspect of the present invention, there is provided a thermal treatment apparatus which further comprises a profile displaying means for displaying a heating profile and a gas supply profile in relation to each other.

According to a further exemplary aspect of the present invention there is provided a thermal treatment apparatus wherein the profile displaying means displays the heating profile or the gas supply profile in the form of a graph. One axis of the graph represents time and the other axis represents temperature (or gas supply) in the thermal treatment chamber.

According to a further exemplary aspect of the present invention, there is provided a method for controlling conditions in a thermal treatment chamber comprising a step of inputting a heating profile governing the application of heat to the thermal treatment chamber by one or more heaters, and a step of inputting a gas flow profile governing the application of gas to the thermal treatment chamber by one or more mass flow controllers. The method further comprises applying heat and gas to the thermal treatment chamber with reference to the heating profile and the gas flow profile using a common time base reference.

DESCRIPTION OF THE PREFERRED EMBODIMENT

An exemplary embodiment of the present invention will be described in detail with reference to the drawings. In the following description, for purposes of explanation and not limitation, specific details are set forth in order to provide a thorough understanding of the invention. However, it will be apparent to one skilled in the art that the present invention may be practiced in other embodiments that depart from these specific details. In other instances, detailed descriptions of well-known methods and devices are omitted so as not to obscure the description of the present invention with unnecessary detail.

Figure 1:
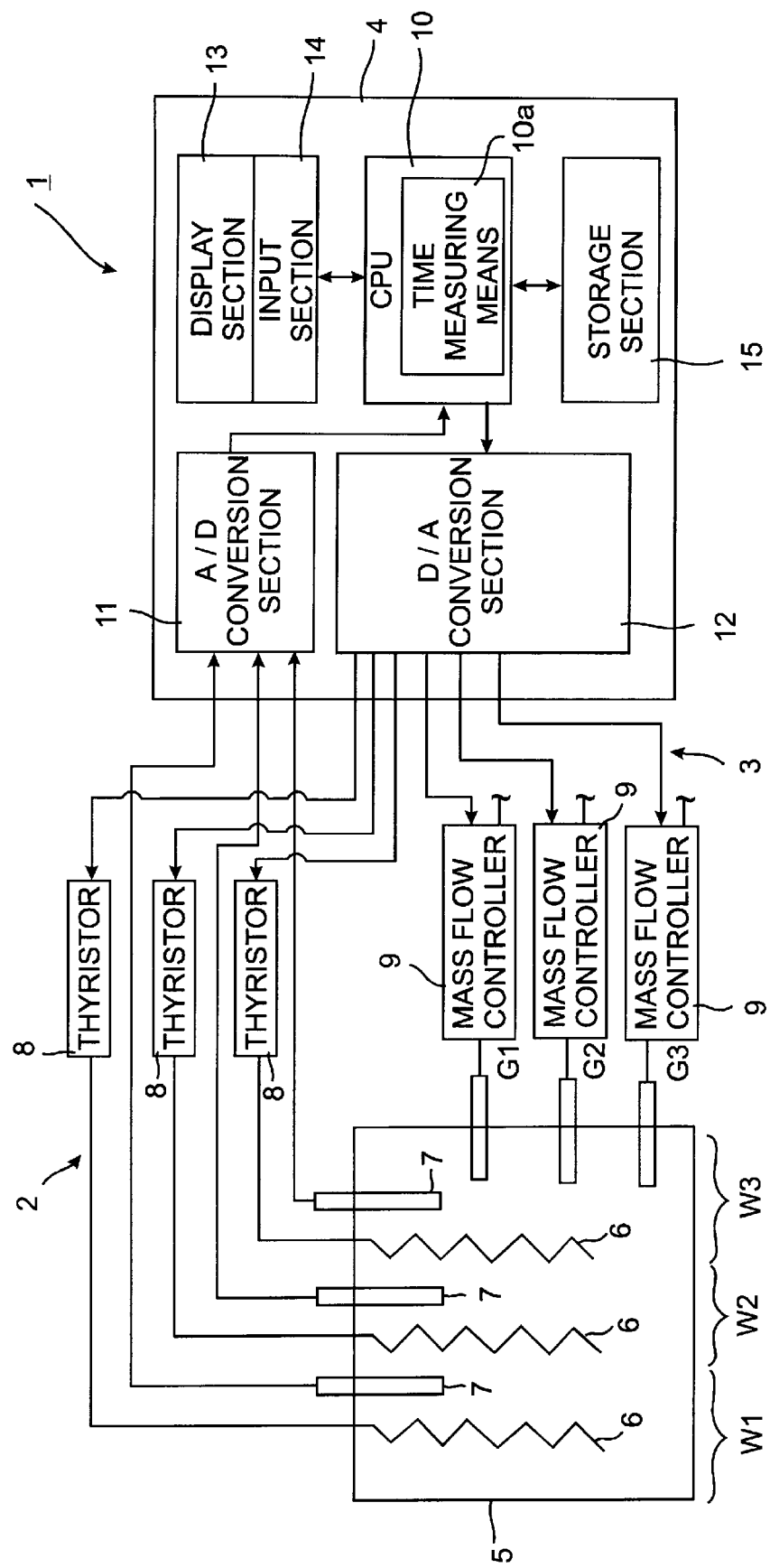
FIG. 1 is a block diagram showing a thermal treatment apparatus according to an exemplary embodiment of the present invention.

FIG. 1 is a block diagram showing a thermal treatment apparatus 1 according to an embodiment of the present invention. The thermal treatment apparatus 1 comprises a heating system 2, a gas supplying system 3 and a multicontroller 4.

The heating system 2 includes a plurality of (in this embodiment, three) heaters 6 for heating a heat treatment chamber 5, and a plurality of (in this embodiment, three) thermocouples 7 for respectively measuring temperatures of the zones W1, W2 and W3 in the heat treatment chamber 5 heated by the heaters 6. A plurality of (in this embodiment, three) thyristors 8 control the heating conditions of the corresponding heaters 6 by command signals transmitted from the multicontroller 4.

The gas supplying system 3 includes a plurality of (in this embodiment, three) mass flow controllers 9 for controlling the amounts of a plurality of (in this embodiment, three) types of atmospheric gases G1, G2 and G3 (such as, but not limited to, air, or components thereof, such as nitrogen or hydrogen) supplied from an atmospheric gas supply section (not shown) to the thermal treatment chamber 5 in accordance with command signals individually inputted from the multicontroller 4.

The multicontroller 4 includes a CPU 10 for performing various control operations, having a time measuring means 10a. The multicontroller 4 further includes an A/D conversion section 11 for converting temperature signals inputted from the thermocouples 7 into digital signals and supplying the digitized temperature signals to the CPU 10. A D/A conversion section 12 converts command signals outputted from the CPU 10 into analog signals and supplies the analog command signals to the thyristors 8 and mass flow controllers 9. A display section 13 displays a heating profile, a gas supply profile and the actual change in temperature of the thermal transfer chamber 5. An input section 14 inputs the heating profile and the gas supply profile, and a storage section 15 stores the heating profile and the gas supply profile inputted by the input section 14 and data of the actual heating and gas supply conditions of the thermal treatment chamber 5.

The thermal treatment apparatus 1 controls the heating system 2 and the gas supplying system 3 simultaneously with one multicontroller 4, thereby reducing the number of components in the control system.

A heat treatment operation performed by the thermal transfer apparatus 1 is controlled as follows. First, when the heating profile and the gas supply profile are inputted by the input section 14, the CPU 10 stores the profiles in the storage section 15. Subsequently, the CPU 10 starts to control the thermal treatment. More specifically, the CPU 10 sends command signals corresponding to the stored heating profile to the thyristors 8, and the thyristors 8 control the exciting conditions of the corresponding heaters 6 responsive to the command signals, whereby heating conditions of the zones W1, W2 and W3 of the thermal treatment chamber 5 are controlled, respectively in a prescribed time sequence specified by the profile. Similarly, the CPU 10 sends command signals corresponding to the stored gas supply profile to the mass flow controllers 9. The mass flow controllers 9 control supply conditions of the atmospheric gases G1, G2 and G3 supplied to the thermal treatment chamber 5 responsive to the command signals in a prescribed time sequence specified by the profile.

When a fluctuation point $N_n$ in the heating profile is detected based on the heat treatment time data from the time measuring means 10a and the temperature data of the thermal treatment chamber 5 from the thermocouples 7, the CPU 10 outputs command signals to the thyristors 8. More specifically, the CPU 10 outputs command signals which specify a new controlling condition to the thyristors 8, respectively. For instance, the new controlling condition corresponds to a heating condition with a heating gradient which differs from the heating gradient before the profile fluctuation point $N_n$. The thyristors 8 then control excitation of the heaters 6, respectively, responsive to the command signals, and control the heating conditions of the heating zones W1, W2 and W3 corresponding to the heating profile.

Similarly, when a gas supplying profile fluctuation point $N'_n$, is detected, the CPU 10, which started measuring time at the same time as the start of heating, outputs command signals to the mass flow controllers 9. More specifically, the CPU 10 outputs command signals for providing a new controlling condition to the mass flow controllers 9, respectively. For instance, the new controlling condition can provide an atmospheric gas supply condition different from the supply condition before the profile fluctuation point $N'_n$. Then, the mass flow controllers 9 control each of the supply conditions of the atmospheric gases G1, G2 and G3 responsive to the command signals.

Because the heating profile fluctuation point $N_n$ and the gas supply profile fluctuation point $N'_n$ are related using a common time base, these points are controlled in relation to each other. In other words, the thermal treatment apparatus 1 enables the timing of the heating profile fluctuation point $N_n$ to coincide with the timing of the gas supply profile fluctuation point $N'_n$ based on the passage of time measured by the single time measuring means 10a included in the CPU 10. Therefore, these profile fluctuation points $N_n$ and $N'_n$ can be controlled in relation to each other with high accuracy.

Figure 2:
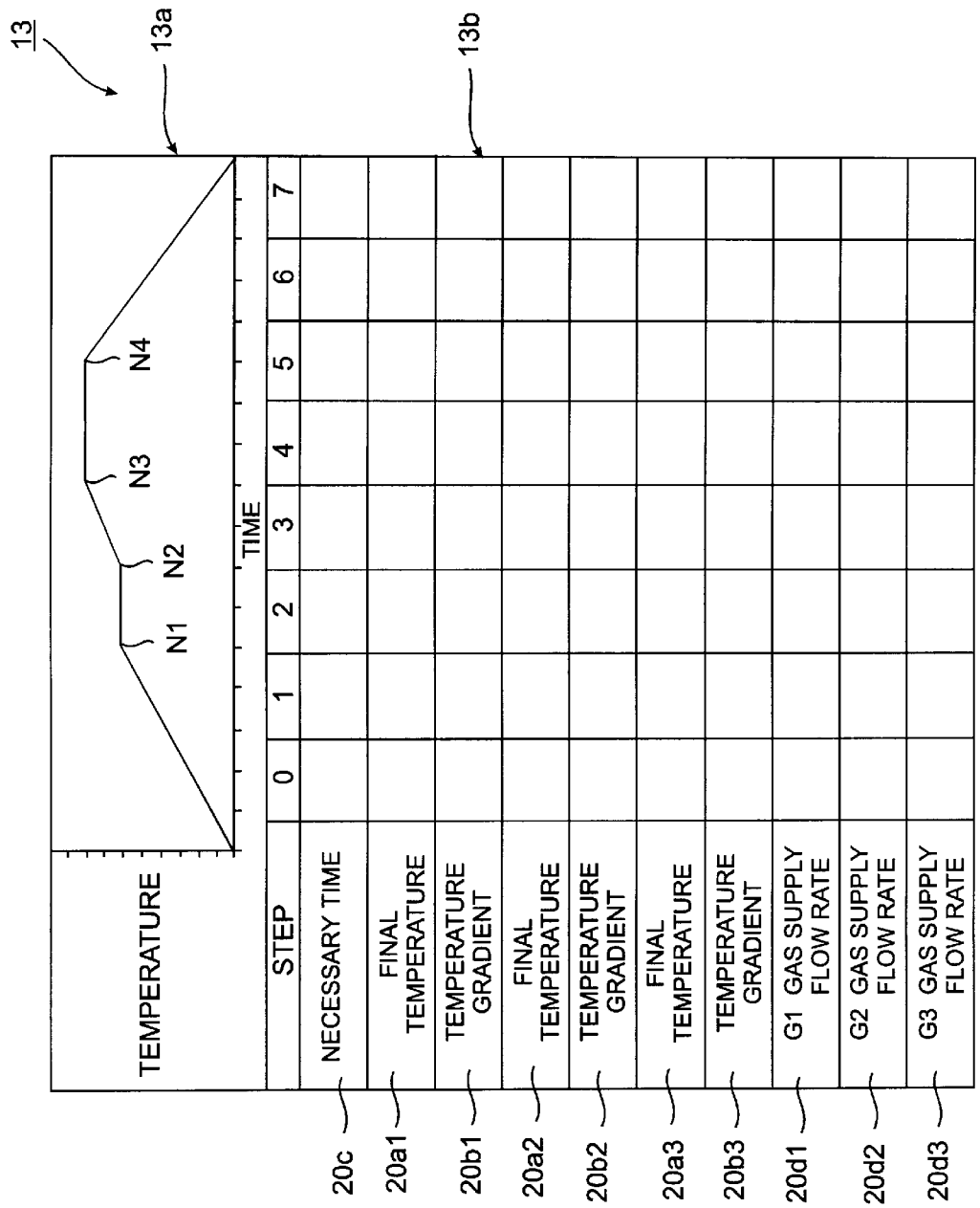
FIG. 2 is a plan view showing a display condition of a display section when profiles are inputted.

The operations for inputting the heating profile and the gas supply profile in the thermal treatment apparatus 1 will now be described with reference to FIG. 2. FIG. 2 is a plan view of the display section 13. The display section 13 has various display modes, such as a profile-input display mode and a thermal treatment-display mode, etc. FIG. 2 illustrates an exemplary display appearance of the profile-input display mode. The input section 14 includes a numerical value inputting means, such as, but not limited to, touch keys and/or a keyboard (not shown).

In the profile-input display mode, the display section 13 comprises a graph display section 13a and a numerical value display section 13b. The graph display section 13a displays a graph in which the horizontal axis represents time and the vertical axis represents temperature. The numerical value display section 13b is divided into intervals (e.g., steps) corresponding to sections of the profile, and includes final temperature display regions $20a_1$, $20a_2$, and $20a_3$ each displaying the final temperatures of the heating zones W1, W2 and W3 in each interval. The section 13b further includes temperature gradient display regions $20b_1$, $20b_2$, and $20b_3$ each displaying the temperature gradients (for example, how many degrees the temperature rises per minute) of the heating zones W1, W2 and W3 in each interval. A necessary time display region 20c displays the necessary time of each interval in the heating zones W1, W2 and W3. Gas supply flow rate display regions $20d_1$, $20d_2$, and $20d_3$ each show supply flow rates of the atmospheric gas G1, G2 and G3 in each interval. The boundary between the intervals can be made to coincide with the above-described profile fluctuation points $N_n$, as illustrated in FIG. 2.

The heating profile and the gas supply profile are inputted as follows by means of the display section 13 and the input section 14. The final temperature and the necessary time (time required for arriving at the final temperature) of each interval are first inputted using the input section 14. Then, the inputted values are displayed in the final temperature display regions $20a_1$, $20a_2$, and $20a_3$ and the necessary time display region 20c, respectively. In addition, the CPU 10 automatically calculates the temperature gradients from the inputted final temperature and the necessary time of each interval and displays the gradients in the temperature gradient display regions $20b_1$, $20b_2$, and $20b_3$. Further, a graph of the heating profile is displayed on the graph display section 13a from the inputted final temperature and the necessary time for each interval. The heating profiles of the heating zones W1, W2 and W3 can be depicted on the graph by illustrating each profile using a different display color or line type (solid line, broken line, one-dot chain line, two-dot chain line, etc.). In FIG. 2, however, to simplify the discussion, the heating profiles of the heating zones W1, W2 and W3 are assumed to be identical, and only one heating profile represented by a solid line is displayed on the graph display section 13a.

Subsequent to, or at the same time as the above input operation of the heating profile, the gas supply profile is inputted to the input section 14. For instance, the gas supply profile can be inputted by making visual reference to the heating profile which has been inputted and displayed on the graph display section 13a and the numerical value display section 13b. Therefore, both heating and gas supply profiles can be efficiently inputted in relation to each other accurately, and further, inputting errors are eliminated.

The inputted gas supply profile can be displayed on the numerical value display section 13b alone as shown in FIG. 2, or can be displayed on the graph display section 13a superimposed on the heating profile (although not shown in FIG. 2). In this case, the vertical axis in the graph display section 13a represents a gas supply flow rate. Alternatively, the gas supply profile can be displayed on the graph display section 13a after switching the display mode of the display section 13 to a gas supply profile display mode.

In FIG. 2, all eight intervals (0 to 7) are displayed simultaneously on the graph display section 13a. However, it will be appreciated that a profile having more intervals can be inputted by scrolling the display of the graph display section 13a and/or section 13b to the left and the right.

Similarly, the display 13 can accommodate additional input cells 20 in the vertical direction, and the sections 13a and/or section 13b can be scrolled up and down to enter the input parameters or to display the input parameters.

When performing heat treatment based on the profiles inputted by the above operations, the actual temperature in the heat treatment chamber 5 can be displayed as follows. First, upon the start of thermal treatment, the display mode of the display section 13 changes to a trend data display mode. The conditions of the heating zones W1, W2 and W3 can then be displayed, and the user can selectively chose the zone or zones from which the conditions are displayed. The change of the display mode and selection of the heating zones W1, W2 and W3 are effected by operating the input section 14. Then, as shown in FIG. 3, the actual temperature changes in the selected heating zones W1, W2 and W3 are graphically displayed on the graph display section 13a, and it can therefore be determined whether or not the temperature in the thermal transfer chamber 5 changes in accordance with the inputted heating profile.

Figure 3:
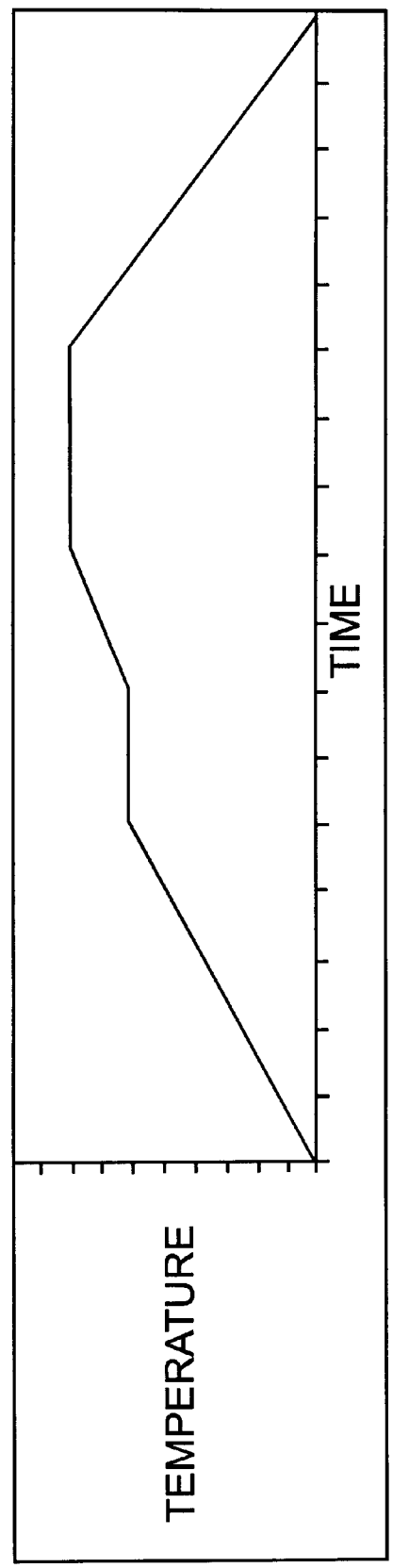
FIG. 3 is a plan view showing a temperature display condition of the display section.
Figure 4:
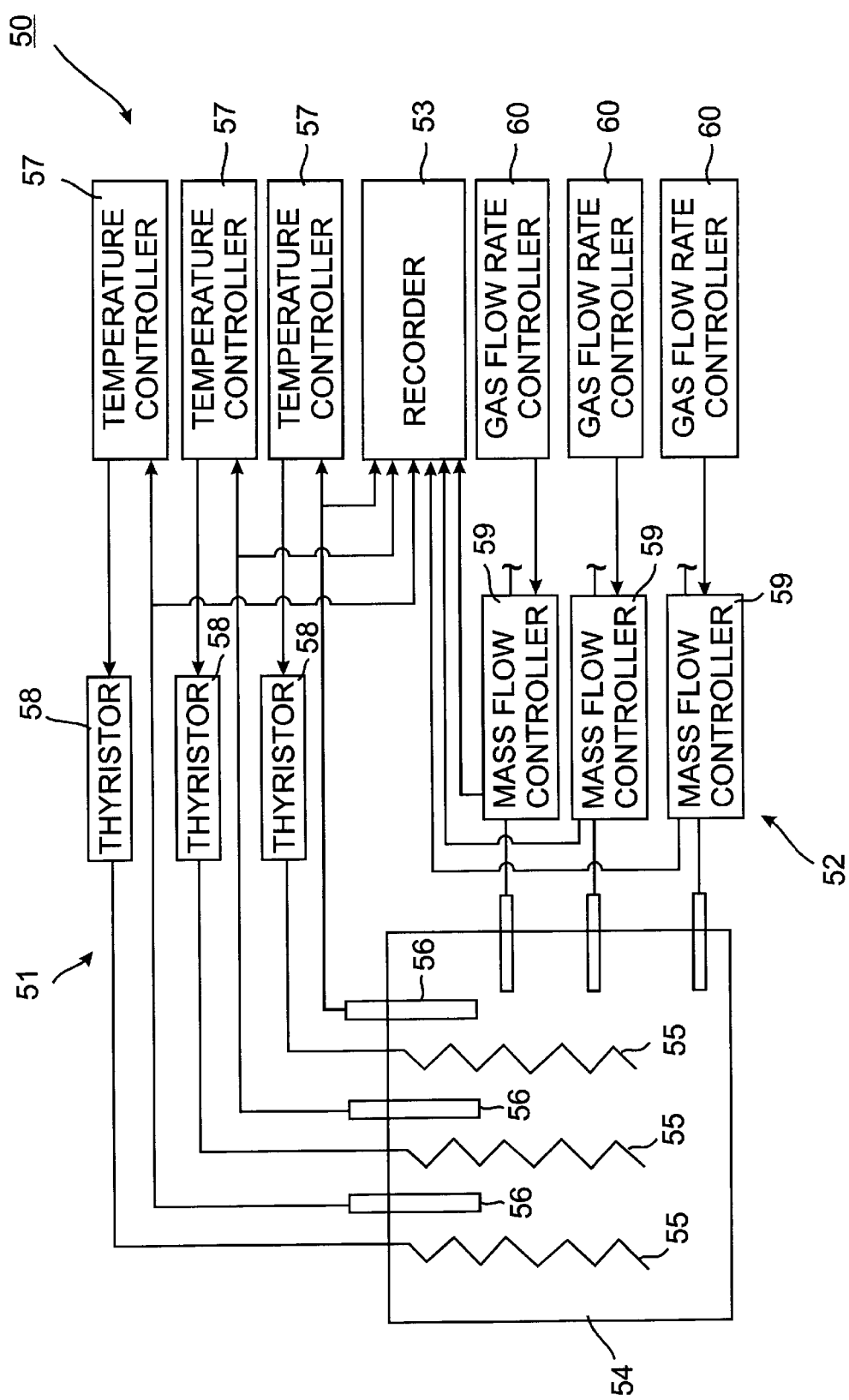
FIG. 4 is a block diagram showing a conventional thermal treatment apparatus.

Although only the temperature changes of the selected heating zones W1, W2 and W3 are displayed in FIG. 3, the inputted heating profile can also be superimposed on this display for comparison with the actual temperature changes. Further, the atmospheric gas supply conditions can be superimposed on this display, which allows the user to easily determine whether the heat treatment is progressing in accordance with the stored profiles.

In the above-described exemplary embodiment, the present invention has been described in the context of a thermal treatment apparatus including three heating zones W1, W2 and W3, and having means for supplying three types of atmospheric gas G1, G2 and G3. However, those skilled in the art will appreciate that the present invention can be used in other embodiments which differ in the number of heating zones and supplied atmospheric gases.

In summary, the thermal treatment apparatus according to the present invention offers the following exemplary advantages. The heating conditions provided by the heating means and the atmospheric gas supply conditions provided by the gas supplying means are controlled in coordinated relation to each other according to a time sequence, so that heat treatment can be performed with high accuracy. In addition, the heating system and the gas supplying system are controlled by a single multicontroller, which simplifies the control of these systems, thereby reducing the cost of the apparatus.

Further, the heating profile and the gas supply profile are displayed in relation to each other by the display section, so that these profiles can be inputted with high accuracy and with great ease.

Still further, the heating profile and the gas supply profile are displayed in the form of a graph, so that the inputted profile can be more readily visualized, thereby further increasing inputting accuracy.

The above-described exemplary embodiments are intended to be illustrative in all respects, rather than restrictive, of the present invention. Thus, the present invention is capable of variations in detailed implementation that can be derived from the description contained herein by a person skilled in the art. All such variations and modifications are considered to be within the scope and spirit of the present invention as defined by the following claims.

What is claimed is:

1. A thermal treatment apparatus, comprising:
heating means for heating a thermal treatment chamber;

gas supplying means for supplying atmospheric gas to said thermal treatment chamber;

temperature measuring means for measuring temperature in said thermal treatment chamber;

a time measuring means for measuring a heat treatment time during which said heating means heats said thermal treatment chamber;

a control means for controlling heating conditions provided by said heating means and atmospheric gas supply conditions provided by said gas supplying means in coordinated relation to each other based on the temperature in said thermal treatment chamber measured by said temperature measuring means and the heat treatment time measured by said time measuring means; and an electronic profile displaying means for graphically displaying plural coordinated time-based control profiles used to control a condition in said thermal treatment chamber to facilitate at least one of: (a) input of said plural coordinated profiles, and (b) monitoring of the application of heat by said heating means and the application of gas by said gas supplying means in accordance with said plural coordinated profiles.

2. A thermal treatment apparatus according to claim 1, wherein said profile displaying means comprises an input mode display used for inputting said plural profiles.

3. A thermal treatment apparatus according to claim 2, wherein said input mode display comprises a first and a second display sections, wherein said first section electronically displays a graphical depiction of at least one profile in graph format and said second section displays numerical values corresponding to selected parameters of said at least one profile.

4. A thermal treatment apparatus according to claim 3, wherein said first section and said second section are divided into intervals, and further wherein said selected parameters are entered for each respective interval.

5. A thermal treatment apparatus according to claim 4, wherein said selected parameters comprise one or more parameters from the following group of parameters:

a necessary time parameter which specifies a time value corresponding to a profile interval;

a final temperature parameter which specifies a temperature value corresponding to a final temperature reached within a profile interval;

a temperature gradient parameter which specifies a gradient value corresponding to a temperature rate of change within a profile interval; and a gas flow rate parameter which specifies a gas flow rate corresponding to a rate at which gas is applied during a profile interval.

6. A thermal treatment apparatus according to claim 1, wherein said profile displaying means comprises an operating mode display used for displaying said plural profiles during the application of heat by said heating means and the application of gas by said gas supplying means.

7. A thermal treatment apparatus according to claim 1, wherein said plural profiles comprise:

one or more heating profiles which govern the application of heat by said heating means to respective heating zones of said thermal treatment chamber; and one or more gas supply profiles governing the application of respective gases by said gas supplying means to said thermal treatment chamber.

8. A thermal treatment apparatus according to claim 7, further comprising means for superimposing at least two profiles for comparison.

9. A thermal treatment apparatus according to claim 7, further comprising means for separately displaying one of a plurality of stored profiles.

10. A thermal treatment display apparatus for interfacing with a thermal treatment apparatus, wherein said thermal treatment apparatus includes a heating means for heating a thermal treatment chamber, a gas supplying means for supplying atmospheric gas to said thermal treatment chamber, and a temperature measuring means for measuring temperature in said thermal treatment chamber, wherein said display apparatus comprises:

an electronic profile displaying device for graphically displaying plural coordinated time-based profiles used to control a condition in said thermal treatment chamber to facilitate at least one of: (a) input of said plural coordinated profiles, and (b) monitoring of the application of heat by said heating means and the application of gas by said gas supplying means in accordance with said plural coordinated profiles.

11. A thermal treatment display apparatus according to claim 10, wherein said profile displaying device comprises an input mode display used for inputting said plural profiles.

12. A thermal treatment display apparatus according to claim 10, wherein said input mode display comprises a first and a second display sections, wherein said first section displays a graphical depiction of at least one profile and said second section displays numerical values corresponding to selected parameters of said at least one profile.

13. A thermal treatment display apparatus according to claim 12, wherein said first section and said second section are divided into intervals, and further wherein said selected parameters are entered for each respective interval.

14. A thermal treatment display apparatus according to claim 13, wherein said selected parameters comprise one or more parameters from the following group of parameters:

a necessary time parameter which specifies a time value corresponding to a profile interval;

a final temperature parameter which specifies a temperature value corresponding to a final temperature reached within a profile interval;

a temperature gradient parameter which specifies a gradient value corresponding to a temperature rate of change within a profile interval; and a gas flow rate parameter which specifies a gas flow rate corresponding to a rate at which gas is applied during a profile interval.

15. A thermal treatment display apparatus according to claim 10, wherein said profile displaying device comprises an operating mode display used for displaying said plural profiles during the application of heat by said heating means and the application of gas by said gas supplying means.

16. A thermal treatment display apparatus according to claim 10, wherein said plural profiles comprise:

one or more heating profiles which govern the application of heat by said heating means to respective heating zones of said thermal treatment chamber; and one or more gas supply profiles governing the application of respective gases by said gas supplying means to said thermal treatment chamber.

17. A thermal treatment display apparatus according to claim 16, further comprising means for superimposing at least two profiles for comparison.

18. A thermal treatment display apparatus according to claim 16, further comprising means for separately displaying one of a plurality of stored profiles.

19. A method for controlling conditions in a thermal treatment chamber comprising:

inputting a time-based heating profile governing the application of heat to said thermal treatment chamber by one or more heaters;

inputting a time-based gas flow profile governing the application of gas to said thermal treatment chamber by one or more mass flow controllers;

electronically displaying a graphical depiction of said heating profile and/or said gas flow profile in response to said inputting steps, such that said profiles can be entered in coordinated relation to each other; and applying heat and gas to said thermal treatment chamber with reference to said heating profile and said gas flow profile using a common time base reference.

20. A method for controlling the conditions in a thermal treatment chamber of claim 19, wherein said inputting steps further comprise the steps of:

inputting a necessary time which specifies the time required for a prescribed interval of said heating profile and said gas flow profile; and inputting a final temperature value which specifies a final temperature value attained within said prescribed interval; and inputting a gas supply flow rate which specifies a rate at which gas is applied to said thermal treatment chamber in said prescribed interval.

21. A method for controlling the conditions in a thermal treatment chamber of claim 20, further comprising the steps of:

displaying a graphical depiction of said heating profile superimposed on said gas flow profile using said common time base reference.

* * * * *